(12) United States Patent
Ahmed et al.

(10) Patent No.: US 11,866,545 B1
(45) Date of Patent: Jan. 9, 2024

(54) ANTI-MICROBIAL BI-METALLIC POLYMERIC COMPOSITE

(71) Applicant: UNITED ARAB EMIRATES UNIVERSITY, Al-Ain (AE)

(72) Inventors: Waleed Khalil Ahmed, Al Ain (AE); Ali H. Al-Marzouqi, Al Ain (AE); Muthanna Ahmed Aziz, Al Ain (AE); Tahir A. Rizvi, Al Ain (AE); Essam Zaneldin, Al Ain (AE); Mushtaq Ahmad Khan, Al Ain (AE)

(73) Assignee: UNITED ARAB EMIRATES UNIVERSITY, Al Ain (AE)

( * ) Notice: Subject to any disclaimer, the term of this patent is extended or adjusted under 35 U.S.C. 154(b) by 0 days.

(21) Appl. No.: 18/125,238

(22) Filed: Mar. 23, 2023

(51) Int. Cl.
| | |
|---|---|
| C08G 63/06 | (2006.01) |
| C08K 3/08 | (2006.01) |
| B29C 64/112 | (2017.01) |
| B33Y 80/00 | (2015.01) |
| B29K 67/00 | (2006.01) |
| B33Y 10/00 | (2015.01) |
| B33Y 70/00 | (2020.01) |

(52) U.S. Cl.
CPC ............ *C08G 63/06* (2013.01); *B29C 64/112* (2017.08); *C08K 3/08* (2013.01); *B29K 2067/046* (2013.01); *B33Y 10/00* (2014.12); *B33Y 70/00* (2014.12); *B33Y 80/00* (2014.12); *C08G 2230/00* (2013.01); *C08K 2003/085* (2013.01); *C08K 2003/0812* (2013.01); *C08K 2003/0856* (2013.01)

(58) Field of Classification Search
CPC ... C08G 63/06; C08G 2230/00; B29C 64/112; C08K 3/08; C08K 2003/0812; C08K 2003/085; C08K 2003/0856; B33Y 70/00; B33Y 80/00; B29K 2067/046
USPC .................. 523/122, 205, 206, 210
See application file for complete search history.

(56) References Cited

U.S. PATENT DOCUMENTS

| | | | |
|---|---|---|---|
| 7,250,453 B2 * | 7/2007 | Sakuma | .................... C08K 9/02 523/210 |
| 2016/0067170 A1 | 3/2016 | Welss et al. | |
| 2016/0138150 A1 | 5/2016 | Pershin et al. | |
| 2019/0054213 A1 | 2/2019 | Hermel-Davidock et al. | |

FOREIGN PATENT DOCUMENTS

| | | |
|---|---|---|
| CN | 201102332 Y | 8/2008 |
| CN | 108065788 A | 5/2018 |
| CN | 112746236 A | 5/2021 |
| CN | 215751240 U | 2/2022 |
| WO | 03006136 A1 | 1/2003 |

OTHER PUBLICATIONS

Mulla et al., "Poly Lactic Acid (PLA) Nanocomposites: Effect of Inorganic Nanoparticles Reinforcement on Its Performance and Food Packaging Applications," Molecules, 2021, 26, 1967.
"Cicla 3D Nano-Infused Copper Antibacterial PLA Filament 2.85mm (1kg) Antibacterial 3D Printing Filament," 3D Universe.

* cited by examiner

*Primary Examiner* — Edward J Cain
(74) *Attorney, Agent, or Firm* — Nath, Goldberg & Meyer; Richard C. Litman

(57) ABSTRACT

Antimicrobial bi-metallic polymeric composites are provided. The bi-metallic polymeric composites include a first metal, a second metal, and a polymeric material and demonstrate especially rapid clearance of a wide variety of bacterial species. Thus, the bi-metallic polymeric composites may be useful in forming or surface treating materials where anti-bacterial properties are desired, including but not limited to surfaces requiring regular sanitization, such as high-contact surfaces in public facilities, medical facilities, or for use in the home. The first metal and the second metal may be any metals affording an electromotive force and may be selected to provide a particular electromotive force.

20 Claims, 17 Drawing Sheets

ANTI-MICROBIAL BI-METALLIC POLYMERIC COMPOSITE

BACKGROUND

1. Field

The disclosure of the present patent application relates to bi-metallic polymeric composites, and particularly to bi-metallic polymeric composites having rapid acting antimicrobial activity.

2. Description of the Related Art

Bacterial contamination of surfaces remains a challenge in a variety of settings, particularly those relating to healthcare. Regularly sanitizing commonly touched surfaces is both expensive and time-consuming, and in the case of particularly frequently contacted surfaces may not be efficient or effective to prevent disease transmission. Thus, recent efforts have been made to develop antibacterial materials that may reduce the risk of surface transmission of bacteria. One significant challenge with the materials developed to date is that they are slow acting, requiring hours or even days to completely clear a bacterial contamination.

Thus, an anti-microbial bi-metallic polymeric composite solving the aforementioned problems is desired.

SUMMARY

In certain embodiments, the bi-metallic polymeric composites include a first metal, a second metal, and a polymeric material and demonstrate especially rapid clearance of a wide variety of bacterial species. Thus, the bi-metallic polymeric composites may be useful in forming or surface treating materials where anti-bacterial properties are desired, including but not limited to surfaces requiring regular sanitization, such as high-contact surfaces in public facilities, medical facilities, or for use in the home. The first metal and the second metal may be any metals affording an electromotive force, and may be selected to provide a particular electromotive force.

In further embodiments, the bi-metallic polymeric composites may be formed by any technique allowing the integration of two metals into a composite, wherein the metal particles are intimately admixed with each other but separated by a polymeric or other insulating material. In one embodiment, the bi-metallic polymeric composites may be formed by extruding composites of a first metal and PLA and of a second metal and PLA using a dual-head 3D printer. In a further embodiment, the bi-metallic polymeric composites may be formulated for spray administration by spraying a mixture of the first metal, the second metal, and the polymeric material onto a surface. In a further embodiment, the bi-metallic polymeric composite may be used as an additive that is intimately admixed into another material during the fabrication process.

In certain embodiments, the bi-metallic polymeric composites may include PLA and a first metal and a second metal, the first metal and the second metal being different metals and being selected from the group consisting of copper, stainless steel, aluminum, and bronze.

These and other features of the present subject matter will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
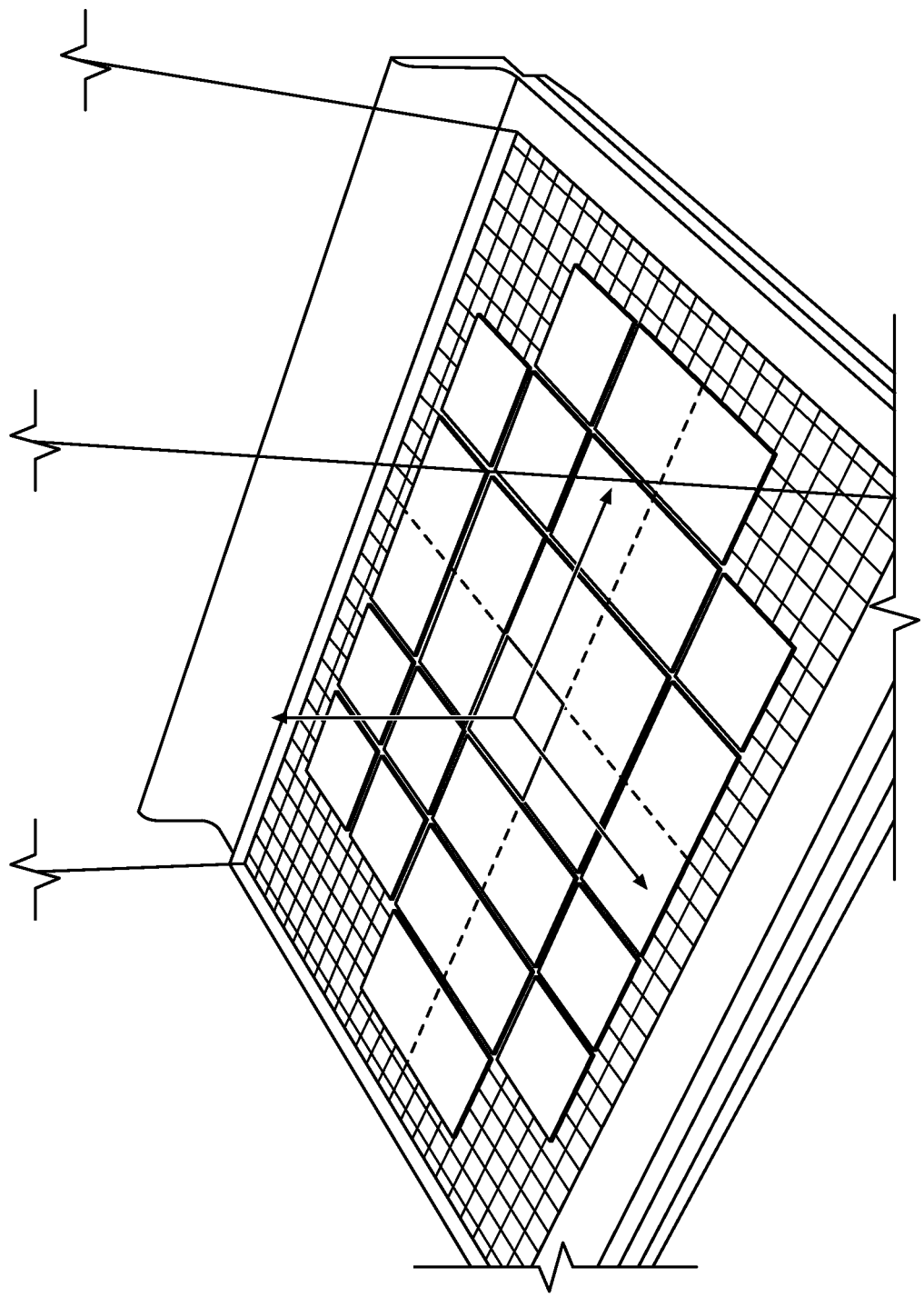
FIG. 1 depicts the Cura slicing of a square sample.

The following definitions are provided for the purpose of understanding the present subject matter and for construing the appended patent claims.

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

Unless defined otherwise, all technical and scientific terms used herein have the same meaning as commonly understood to one of ordinary skill in the art to which the presently described subject matter pertains.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

As used herein, the term "polymeric material" refers to any polymer or other insulating material capable of insulating two metals when formed into a composite therewith. In a non-limiting example, the polymeric material may be a thermoplastic polymer, such as polylactic acid (PLA).

In certain embodiments, the bi-metallic polymeric composites include a first metal, a second metal, and a polymeric material and demonstrate especially rapid clearance of a wide variety of bacterial species. Thus, the bi-metallic polymeric composites may be useful in forming or surface treating materials where anti-bacterial properties are desired, including but not limited to surfaces requiring regular sanitization, such as high-contact surfaces in public facilities, medical facilities, or for use in the home. The first metal and the second metal may be any metals affording an electromotive force, and may selected to provide a particular electromotive force.

In further embodiments, the bi-metallic polymeric composites may be formed by any technique allowing the integration of two metals into a composite, wherein the metal particles are intimately admixed with each other but separated by a polymeric or other insulating material. In one embodiment, the bi-metallic polymeric composites may be formed by extruding composites of a first metal and PLA and of a second metal and PLA using a dual-head 3D printer. In this embodiment, the bi-metallic polymeric composite may comprise a plurality of first metal strips and a plurality of second metal strips printed on a polymeric substrate in a side-by-side relationship (see FIG. 9). In a further embodiment, the bi-metallic polymeric composites may be formulated for spray administration by spraying a mixture of the first metal, the second metal, and the polymeric material onto a surface. In a further embodiment, the bi-metallic polymeric composite may be used as an additive that is intimately admixed into another material during the fabrication process.

In certain embodiments, the bi-metallic polymeric composites may include PLA and a first metal and a second metal, the first metal and the second metal being different metals and being selected from the group consisting of copper, stainless steel, aluminum, and bronze.

The anti-microbial activity of the bi-metallic polymeric composites is understood to arise from the voltage difference between the first metal and the second metal. Specifically, the electromotive force resulting from the incorporation of the two different metals into a single non-conductive polymer composite is understood to be proportional to the efficiency of the antibacterial characteristics.

The bi-metallic polymeric composites have rapid acting antimicrobial activity against both gram positive and gram negative bacteria. The bi-metallic polymeric composites may be particularly efficient at clearing contamination with *E. coli, S. Aureus, P. aueruginosa, S. poona*, and *Enterococci*. Thus, the bi-metallic polymeric composites may be useful for preventing the spread of disease via frequently contacted surfaces, and may reduce the need for regular sterilization of these surfaces in medical or other settings.

In certain embodiments, the bi-metallic polymeric composites may be effective to kill more than 97% of bacterial cells withing five minutes upon contacting the composite with a liquid comprising said bacterial cells. In further embodiments, the bi-metallic polymeric composites may be effective to kill more than 98% of bacterial cells withing ten minutes upon contacting the composite with a liquid comprising said bacterial cells. In yet further embodiments, the bi-metallic polymeric composites may be effective to kill more than 99% of bacterial cells withing twenty minutes upon contacting the composite with a liquid comprising said bacterial cells.

The bi-metallic polymeric composites may be applied to any surface where antibacterial activity would be desired. In certain embodiments, the bi-metallic polymeric composites may be incorporated into or sprayed onto textiles, face masks, fabrics, clothes, shoes, or the like. In other embodiments, the bi-metallic polymeric composites may be incorporated into or sprayed onto structures for use in medical settings, including chairs, desks, door handles, medical testing devices, medical treatment devices, medical devices intended for implantation into the body, or the like.

Additive manufacturing (AM) encompasses a variety of fabrication technologies. The most commonly utilized method is material extrusion (ME), in which a material filament is fed into the extrusion system and heated near the melting temperature of the polymer. The end effector will feed and fuse the new material layer to the previous one. By fabricating metal parts via ME, the ease of operation, safety, and waste reduction are greatly improved. By utilizing ME technology, the disadvantages above can be mitigated to produce relatively inexpensive metal parts within a unique research area that is narrowly studied. This method involves fusing a polymer matrix and metal powder to produce a filament that is denoted as a metal-polymer composite (MPC).

The anti-microbial bi-metallic polymeric composite is a MPC in a 3D printing filament form. The filaments are made of metal powder encased in a binder of environmentally friendly, biodegradable, and carbon-neutral polymers (PLA). This material allows for safer operation and avoids exposure to powdered metals. Four types of filament have been used with a base binder which is PLA:Copper/PLA, Aluminum 6061/PLA, Bronze/PLA, and Stainless Stee 17-4/PLA. The specific compositions of these composites may include: (1) Sample 1: Copper/PLA, Copper/PLA filament containing 90% copper metal by weight and having a density of 4.7 g/cc; (2) Sample 2: Aluminum 6061/PLA, Aluminum 6061/PLA filament containing 65% Al 6061 metal by weight and having a density of 1.54 g/cc; (3) Sample 3: Bronze/PLA, CuSn/PLA filament containing 90% Bronze metal by weight and having a density of 4.5 g/cc; (4) Sample 4: Stainless Steel 17-4/PLA, SS 17-4/PLA filament containing around 85% SS 17-4 metal by weight and having a density of 3.0 g/cc. Each composite includes micro metal powder and a polymer matrix produced through a mixing process by an extruder. The spooler pulls the extruded material from the extrusion nozzle at a constant linear travel rate. It optionally allows spooling of the material, where the spool speed usually is greater than the speed of the tension roller.

The bi-metallic polymeric composites may be better understood in view of the following examples.

Example 1

Synthesis of the Anti-Microbial Bi-Metallic Material

The material utilized for this investigation is a MPC in a 3D Printing filament form. The filaments are made of metal powder encased in a binder of environmentally friendly, biodegradable, and carbon-neutral polymers (PLA). This allows safer operation and avoids exposure to powdered metals. Four types of filament were studied with a base binder which is PLA:Copper/PLA, Aluminum 6061/PLA, Bronze/PLA, and Stainless Stee 17-4/PLA. The compositions of these composites are as follows: (1) Sample 1: Copper/PLA, Copper/PLA filament containing 90% copper metal by weight and having a density of 4.7 g/cc; (2) Sample 2: Aluminum 6061/PLA, Aluminum 6061/PLA filament containing 65% Al 6061 metal by weight and having a density of 1.54 g/cc; (3) Sample 3: Bronze/PLA, CuSn/PLA filament containing 90% Bronze metal by weight and having a density of 4.5 g/cc; (4) Sample 4: Stainless Stee 17-4/PLA, SS 17-4/PLA filament containing around 85% SS 17-4 metal by weight and having a density of 3.0 g/cc. Each composite includes a micro metal powder and a polymer matrix produced through a mixing process by an extruder. The spooler pulls the extruded material from the extrusion nozzle at a constant linear travel rate. It optionally allows spooling of the material, where the spool speed usually is greater than the speed of the tension roller.

The sample (40 mm×40 mm×1 mm), was designed by CAD software Fusion 360 and sliced using Cura 4.10, which is an open-source slicing application for 3D printers. Ultimaker Cura is used by over one million users worldwide and handles more than a million print jobs per week, thus making it the preferred 3D printing software for Ultimaker 3D printers, but it can be used with other printers as well.

Figure 2:
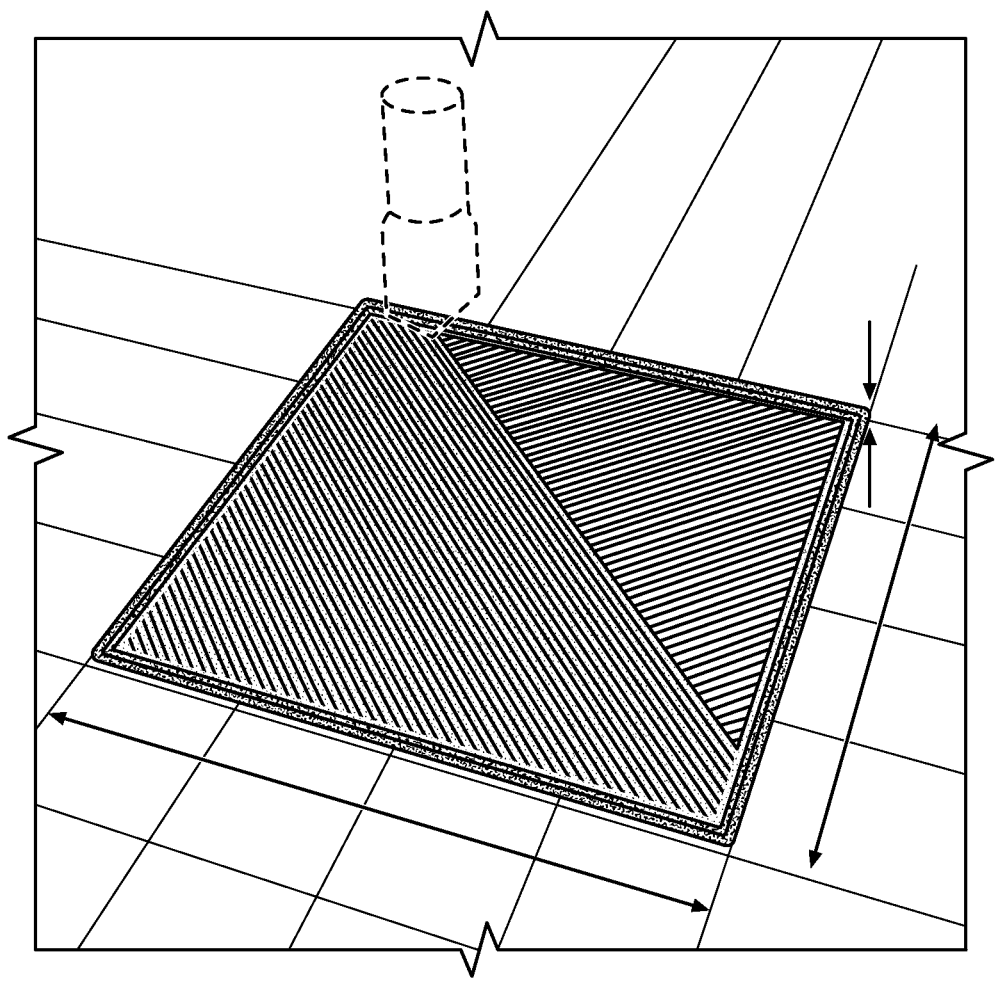
FIG. 2 depicts a simulation of the 3D printing process with slicing features by Cura.
Figure 3:
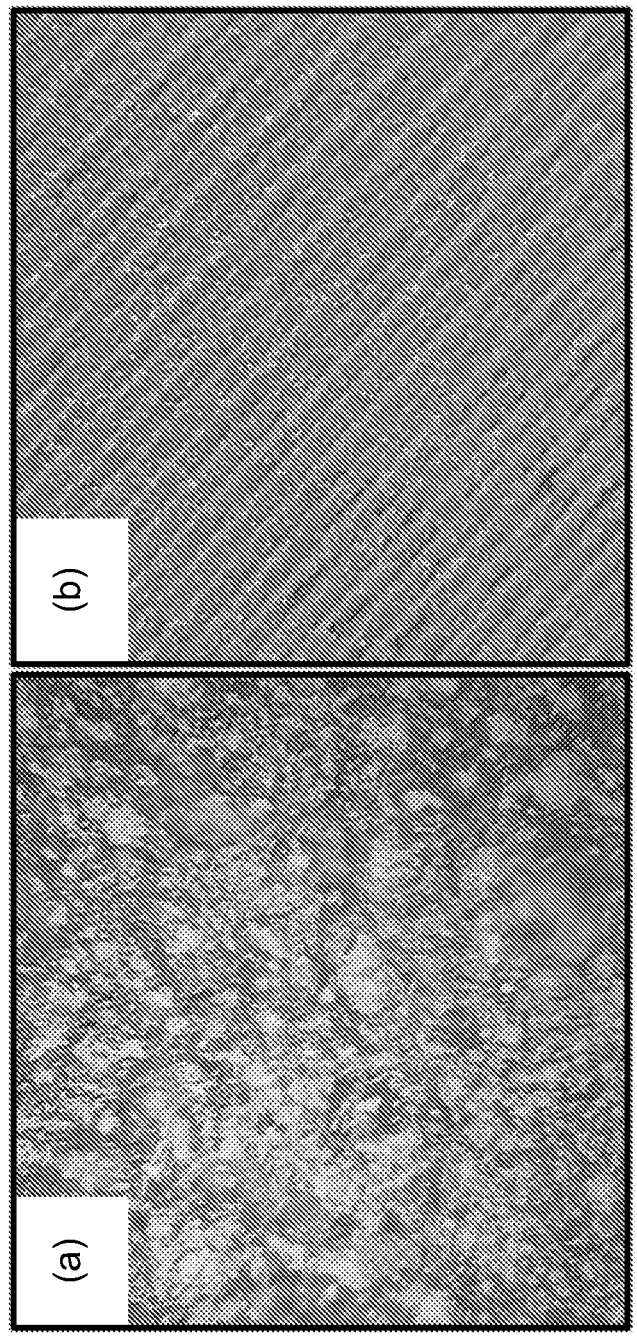
FIG. 3 depicts microscopic images of the CU/PLA composite (A) and the 3D printed sample (B).

The time needed to produce one sample is 8 min and consumes around 0.26 m or 8 grams of the material filament for the Copper/PLA material as an example. Although antimicrobial tests required 25 samples to cover the microbes' type and the incubation time, 30 samples were produced to keep spare samples. The thirty 3D printed samples took around 4 hrs. to prepare the CAD design and the slicing software and 13 hrs. of production time, consuming 226 grams of the CU/PLA filament (around 7.88 m). The Cura slicing of the square sample is illustrated in FIG. 1. A simulation of the 3D printing process with slicing features by Cura is illustrated in FIG. 2. Microscopic images of the CU/PLA composite and of the 3D printed sample are show in FIG. 3.

The configuration of the Cura setting was considered as follows; Layer height 0.2 mm, Infill pattern Lines, Infill density 100%, no support, no adhesion type, speed 45 mm/s, and 100% fan cooling.

Due to the smooth surface of the printing bed, the backside of the sample is softer than the front side. Therefore, the smooth side of any 3D printed sample is always used for conducting antimicrobial testing.

An Ultimaker UM S5 (3D printer) was used to print the testing samples. The Ultimaker S5 is specially designed to print with composite materials and can be used at a maximum temperature of 300° C. Composite materials of third-party material suppliers can wear out the standard nozzles Ultimaker UM S5 (nozzles AA). For this reason, we used print core CC. Specifically, we used a hardened steel nozzle sized at 0.6 mm (Ultimaker print core CC 0.6). The printing nozzle temperature was maintained at 210° C. The printing bed temperature was held at 50° C. and covered with a layer of blue painter's tape or glue sticks on the print bed to achieve excellent adhesion to the bed, and the printing flow rate was 135%.

The filament is preheated at 60° C. using a warming chamber placed before the feeding gear to minimize any filament bend as it comes off the spool. As the filament passes through the warmer, the memory of the filament is reset and prints with ease.

Four samples of 3D printed polymeric composite sheets having a known composition of (polylactic acid and copper), (polylactic acid and aluminium), (polylactic acid and bronze) and (polylactic acid and stainless steel) were prepared and labeled as Samples 1-4, respectively. The antimicrobial activity of the prepared samples was tested against common bacteria that was derived from ATCC and NCTC. Plastic was taken as a control surface, and the efficiency of the antimicrobial sheets was estimated and compared for time intervals of 5 minutes, 10 minutes, 20 minutes, 1 hr., 8 hrs., and 24 hrs. The testing protocol was devised based on ISO 22196:2011 (Perez-Gavilan A. et al., "Antibacterial activity testing methods for hydrophobic patterned surfaces," Scientific Reports 11(1): 1-10 (2021)). Microbiology analytical methods were used from CCFRA:1:1:4:2003 (Campden, Chorleywood Food Research A: Manual of microbiological methods for the food and drink industry. Chipping Campden [England]: Campden & Chorleywood Food Research Association, 2007). The recovered bacterial count on the control sheet during different time intervals is given in Table 1.

TABLE 1

Bacterial Count on Control Sheet at Different Time Intervals

| Sample | Type of Bacteria | Inoculum | Bacterial Count | | | | | |
|---|---|---|---|---|---|---|---|---|
| | | | 5 min | 10 min | 20 min | 1 hour | 8 hrs. | 24 hrs. |
| Control Sheet | Escherichia coli | 9500 | 9296 | 9016 | 8680 | 7784 | 5432 | 2352 |
| | Staphylococcus aureus | 5000 | 4536 | 4480 | 4200 | 3136 | 2520 | 9 |
| | Pseudomonas aeruginosa | 7500 | 7280 | 6944 | 6440 | 4074 | 2632 | 23 |
| | Salmonella poona | 9000 | 8512 | 8456 | 8232 | 7168 | 1364 | 684 |
| | Enterococci | 5000 | 4312 | 4256 | 3976 | 3080 | 2968 | 89 |

Figure 4:
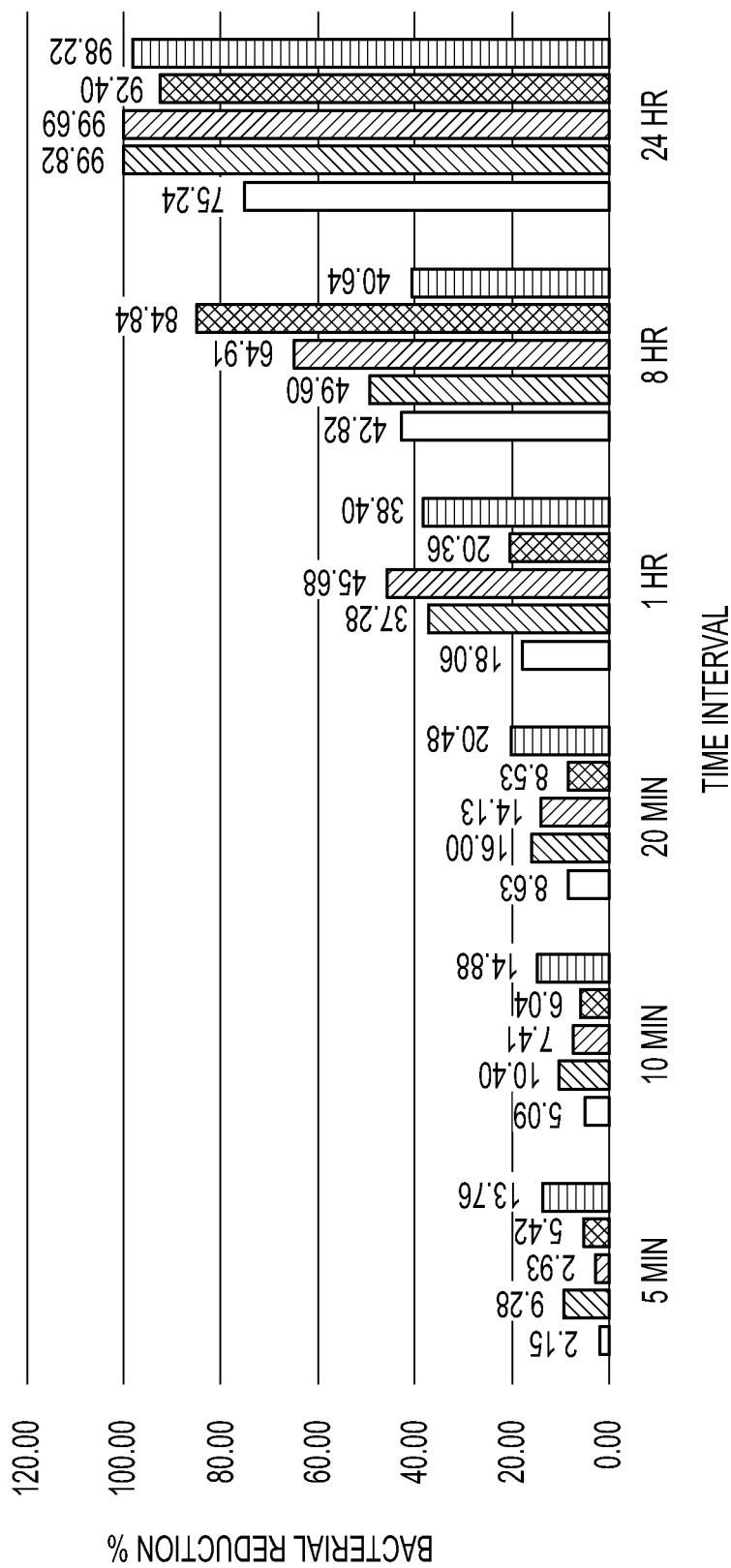
FIG. 4 depicts a graph of the bacterial reductions observed for control sheets.

It can be observed from Table 1 that the quantity of each species of bacteria naturally decrease in numbers from 5 minutes to 24 hours. Of the bacteria tested, a lesser effect was observed for Escherichia coli and Salmonella poona, as they were present in a considerable number even after 24 hours. The percentage of bacterial reduction on the control sheet is depicted in FIG. 4. The reduction percentage was significantly less and showed a random trend from 5 to 20 minutes for different types of bacteria. However, the percentage reduction started increasing after 20 minutes and a maximum reduction percentage of 99.82% was observed for Staphylococcus aureus bacteria after 24 hrs, as shown in FIG. 4.

The amount of bacteria on PLA/copper sample during different time intervals is given in Table 2. The number of recovered bacteria on the PLA/copper sample sheet after only 20 minutes was significantly less than the control sheet and remained reduced up to 24 hrs. This proves that the antimicrobial efficiency of the composite sheet produced from polylactic acid and copper against different types of common bacteria is excellent. These results are better than the previous studies stated by Maslana K et al. (Maslana K. et al., "Boosting of antibacterial performance of cellulose based paper sheet via TiO2 nanoparticles," International Journal of Molecular Sciences 22(3): 1451 (2021)). They tested the efficiency of a cellulose-based composite sheet against (E. coli and S. aureus) and found a 60% reduction of these bacteria after 24 hrs. against the prepared composite.

Figure 5:
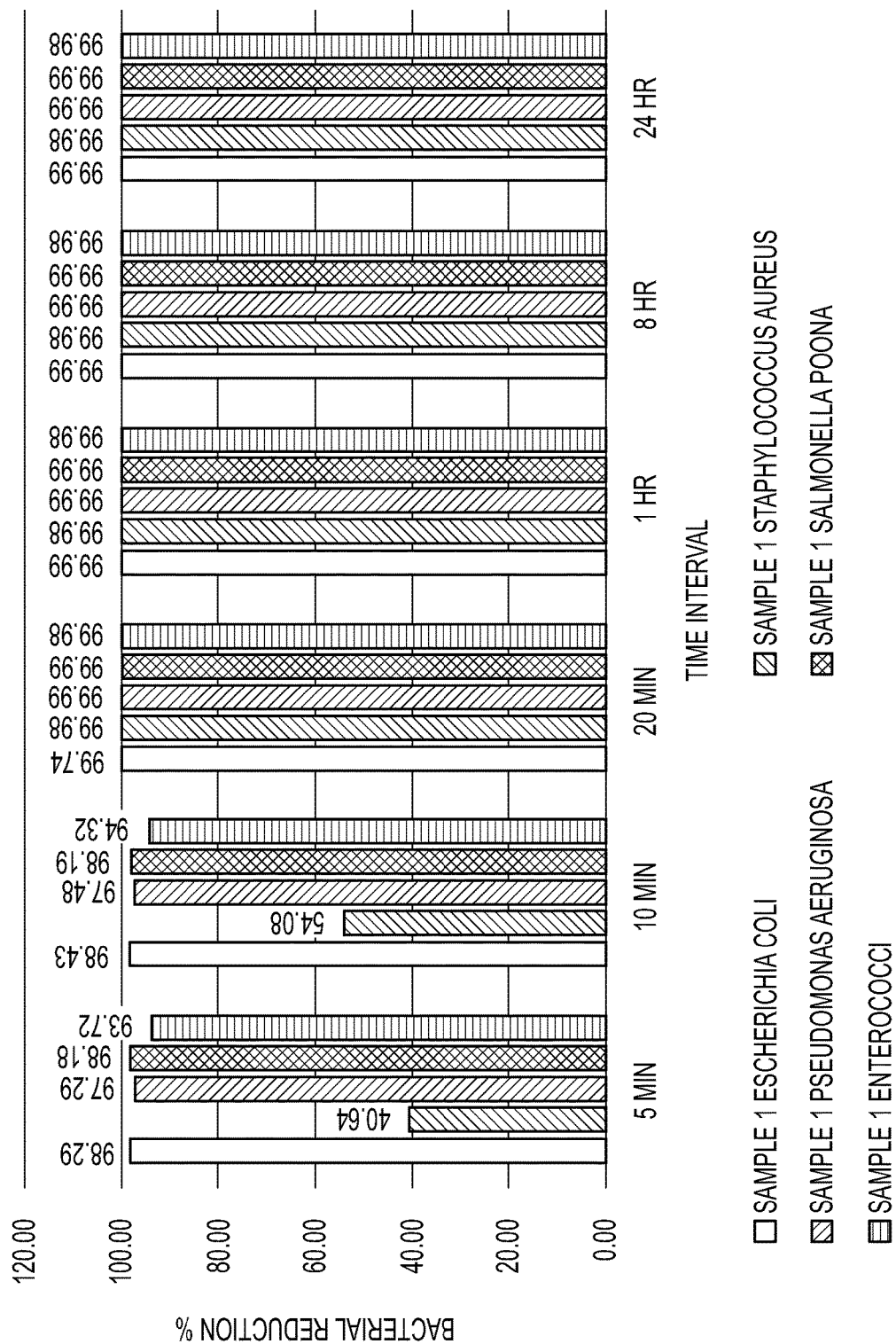
FIG. 5 depicts a graph of the bacterial reduction observed for PLA/Copper sheets

The percentage of bacterial reduction for PLA/copper sheet is shown in FIG. 5. It can be observed that the maximum reduction in the growth of bacteria was achieved after only 10 minutes except for S. aureus, which was also reduced by 99.98% after 20 minutes. These results are comparably better than the previous studies described in the literature. Caires, et al. (Caries, C. S. et al., "Effective killing of bacteria under blue-light irradiation promoted by green synthesized silver nanoparticles loaded on reduced graphene oxide sheets," Materials Science and Engineering: C, 113: 110984 (2020)) tested the antimicrobial efficiency of reduced graphene oxide sheets loaded with silver nanoparticles against Staphylococcus aureus bacteria and achieved a 99.4% reduction in growth after 8 hrs.

The number of bacteria found on the PLA/Aluminium-6061 sheet during different time intervals is given in Table 3. Several types of bacteria showed a lower reduction (at certain time intervals) on the PLA/Aluminium-6061 sheet as compared to the PLA/copper sheet. This indicates that the composite of PLA and copper has a better tendency to inhibit the growth of bacteria than PLA and aluminum. However, the recovered amount of S. aureus and Enterococci on PLA and aluminum sheet was small enough after 1 hr. as shown in Table 3.

TABLE 2

Bacterial Count on PLA/Copper Sheet at Different Time Intervals

| Sample | Type of Bacteria | Inoculum | Bacterial Count | | | | | |
|---|---|---|---|---|---|---|---|---|
| | | | 5 min | 10 min | 20 min | 1 hour | 8 hrs. | 24 hrs. |
| Control Sheet | Escherichia coli | 9500 | 162 | 149 | 25 | 1 | 1 | 1 |
| | Staphylococcus aureus | 5000 | 2968 | 2296 | 1 | 1 | 1 | 1 |
| | Pseudomonas aeruginosa | 7500 | 203 | 189 | 1 | 1 | 1 | 1 |
| | Salmonella poona | 9000 | 164 | 163 | 1 | 1 | 1 | 1 |
| | Enterococci | 5000 | 314 | 284 | 1 | 1 | 1 | 1 |

TABLE 3

Bacterial Count on PLA/Aluminum-6061 Sheet at Different Time Intervals

| Sample | Type of Bacteria | Inoculum | Bacterial Count | | | | | |
|---|---|---|---|---|---|---|---|---|
| | | | 5 min | 10 min | 20 min | 1 hour | 8 hrs. | 24 hrs. |
| Control Sheet | Escherichia coli | 9500 | 8848 | 8288 | 5320 | 4648 | 1 | 1 |
| | Staphylococcus aureus | 5000 | 4032 | 3304 | 89 | 51 | 1 | 1 |
| | Pseudomonas aeruginosa | 7500 | 7392 | 7168 | 2464 | 2408 | 1 | 1 |
| | Salmonella poona | 9000 | 8064 | 7784 | 492 | 388 | 1 | 1 |
| | Enterococci | 5000 | 3864 | 3528 | 1232 | 5 | 1 | 1 |

Figure 6:
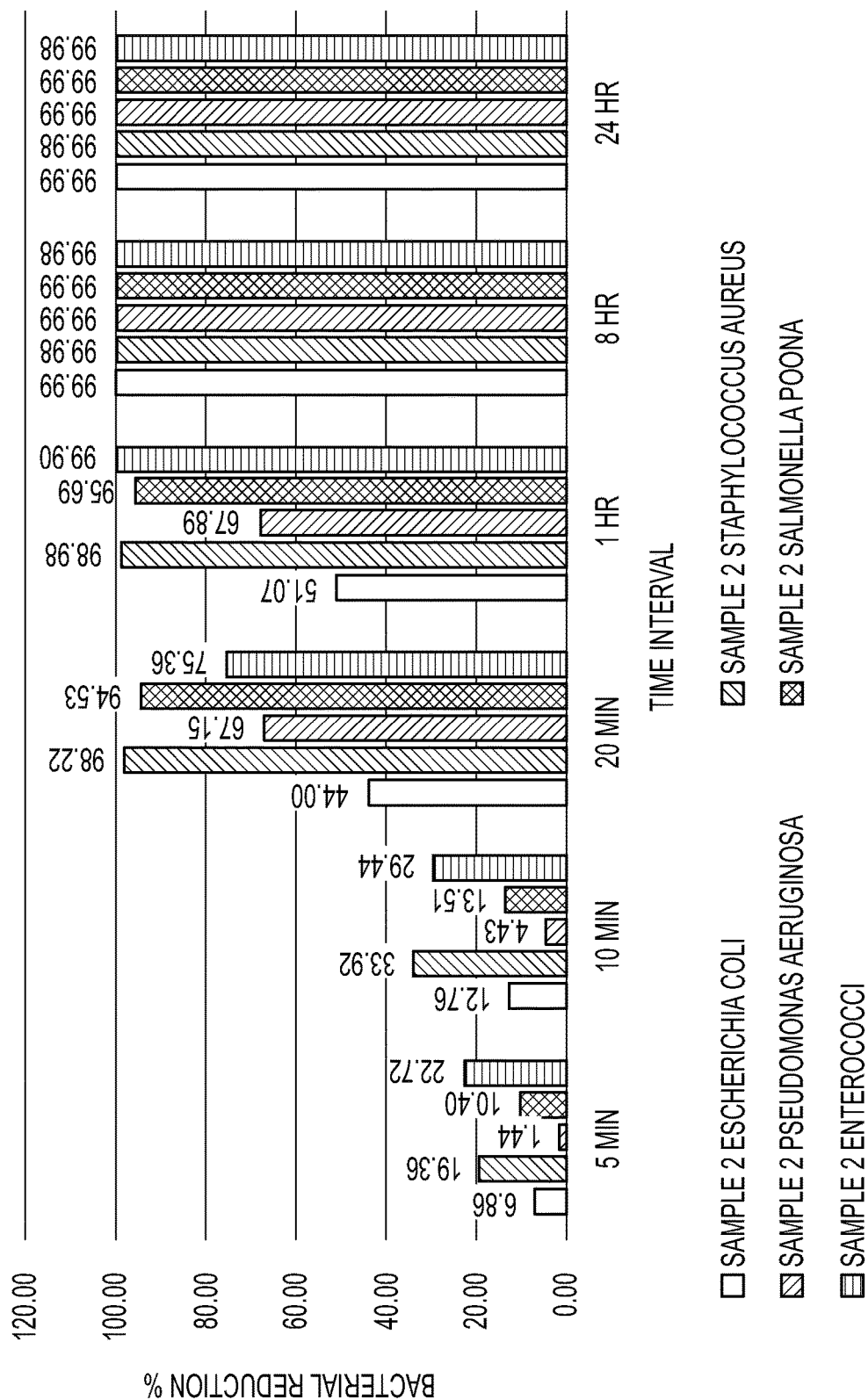
FIG. 6 depicts a graph of the bacterial reduction observed for PLA/Aluminu-6061 sheets.

The percentage of bacterial reduction for PLA/Aluminum-6061 is shown in FIG. 6. The rate of bacterial log reduction was observed as maximum i.e., 99.99% after 8 hrs. for all types of bacteria as shown in FIG. 6.

The amount of bacteria detected on the PLA/Bronze sheet during different time intervals is tabulated in Table 4. The PLA and bronze-based polymeric composite sheet achieved excellent results after 10 minutes of process interval. The recovered amount of all five types of bacteria was exceedingly small and almost diminished after 20 minutes.

TABLE 4

Bacterial Count on PLA/Bronze Sheet at Different Time Intervals

| Sample | Type of Bacteria | Inoculum | Bacterial Count | | | | | |
|---|---|---|---|---|---|---|---|---|
| | | | 5 min | 10 min | 20 min | 1 hour | 8 hrs. | 24 hrs. |
| Control Sheet | Escherichia coli | 9500 | 3584 | 35 | 3 | 1 | 1 | 1 |
| | Staphylococcus aureus | 5000 | 1696 | 304 | 9 | 1 | 1 | 1 |
| | Pseudomonas aeruginosa | 7500 | 15 | 1 | 1 | 1 | 1 | 1 |
| | Salmonella poona | 9000 | 17 | 1 | 1 | 1 | 1 | 1 |
| | Enterococci | 5000 | 656 | 19 | 1 | 1 | 1 | 1 |

Figure 7:
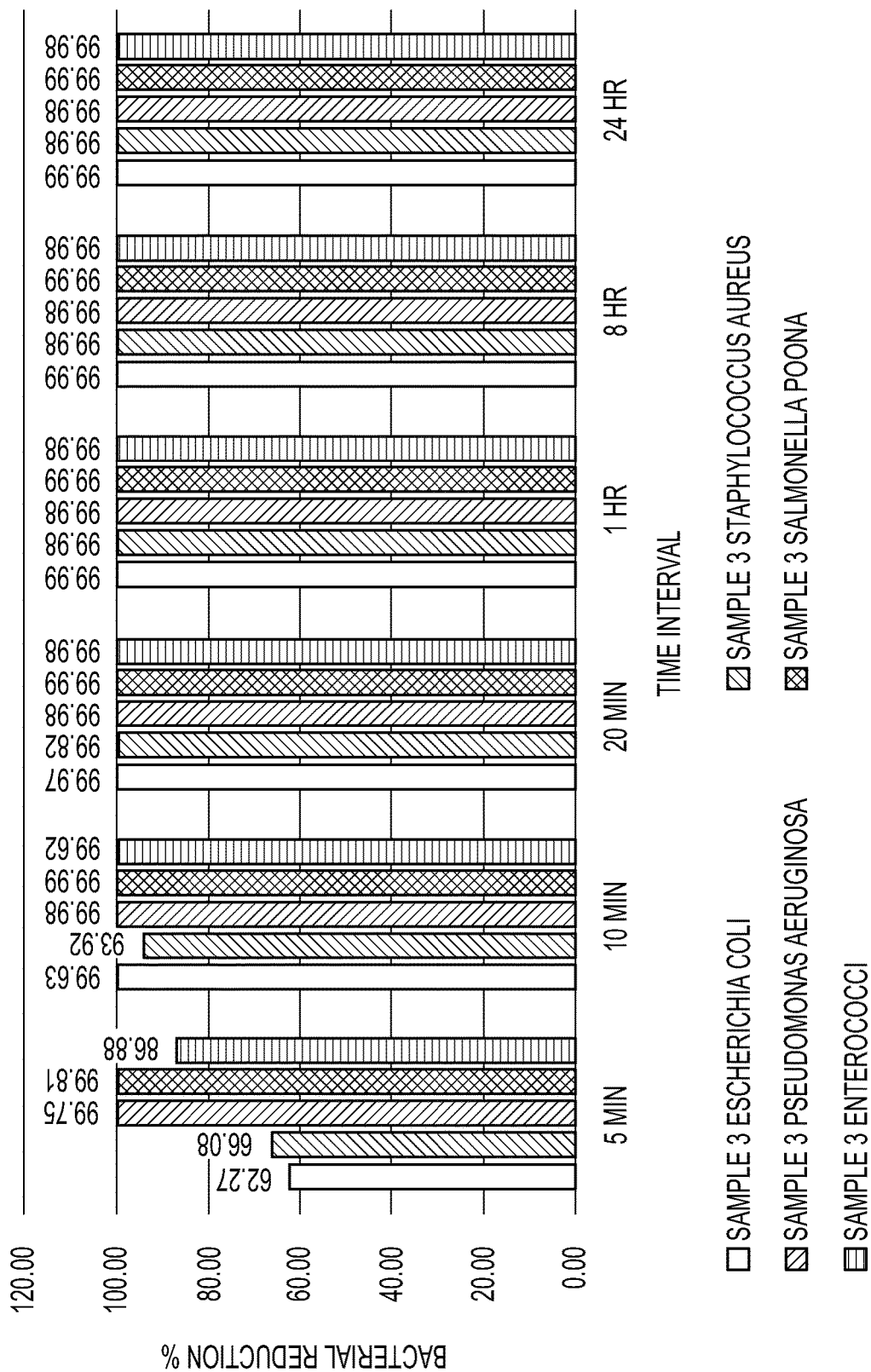
FIG. 7 depicts a graph of the bacterial reduction observed for PLA/bronze sheets.

The percentage bacterial reduction for PLA/Bronze sheet is shown in FIG. 7. The maximum reduction of 99.75% for *Pseudomonas aeruginosa* and 99.81% for *Salmonella poona* were achieved just after 5 minutes.

Figure 8:
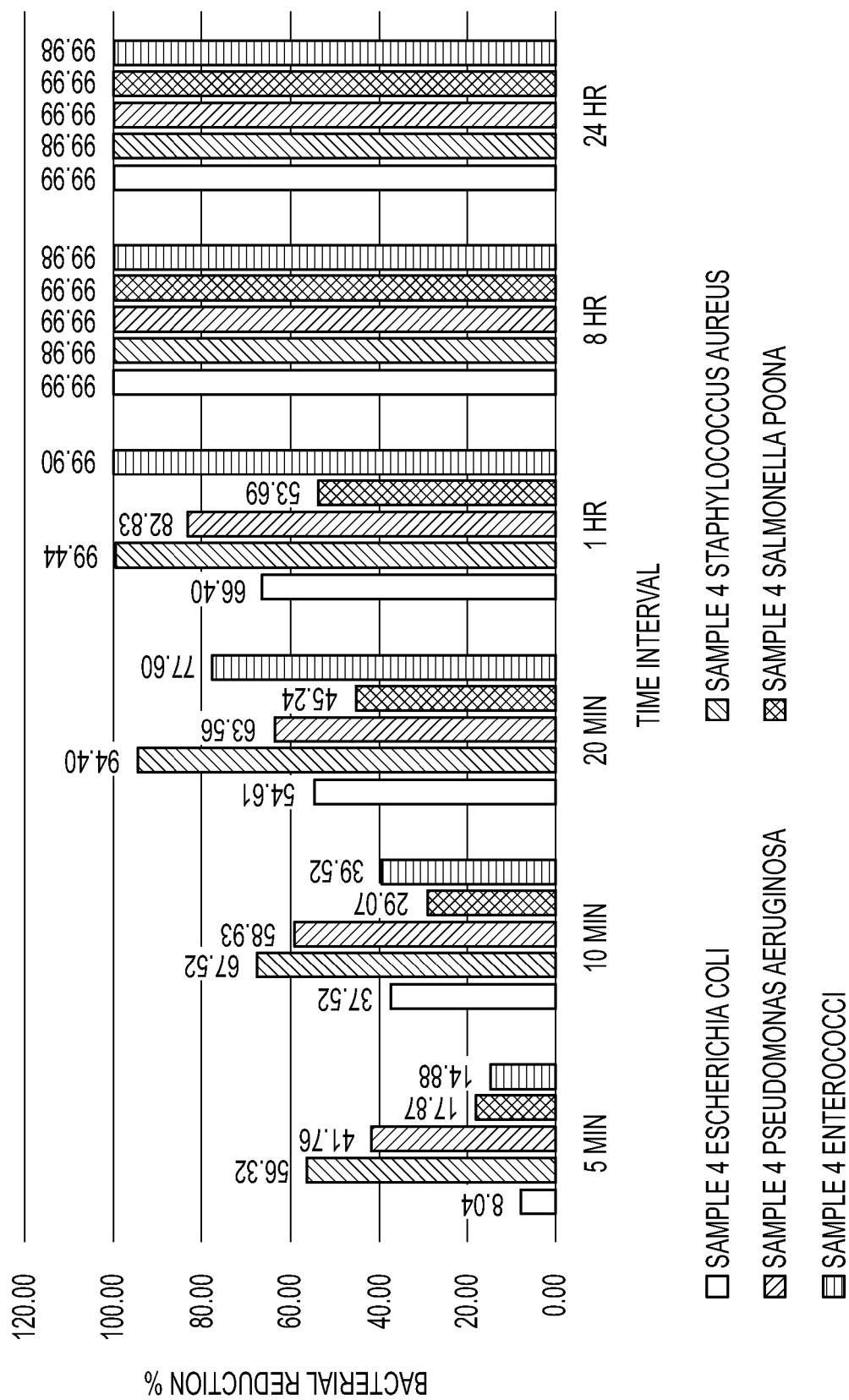
FIG. 8 depicts a graph of the bacterial reduction observed for PLA/stainless steel sheets.

The amount of bacteria on the PLA/Stainless steel 17-4 sheet during different time intervals is given in Table 5. This sample demonstrated less efficiency as compared to other samples with respect to time. Bacterial count was minimum after 8 hrs. and 24 hrs. as shown in Table 5. The percentage bacterial reduction for PLA/Stainless steel 17-4 sheet is shown in FIG. 8.

TABLE 5

Bacterial Count on PLA/Stainless Steel 17-4 at Different Time Intervals

| Sample | Type of Bacteria | Inoculum | Bacterial Count | | | | | |
|---|---|---|---|---|---|---|---|---|
| | | | 5 min | 10 min | 20 min | 1 hour | 8 hrs. | 24 hrs. |
| Control Sheet | Escherichia coli | 9500 | 8736 | 5936 | 4312 | 3192 | 1 | 1 |
| | Staphylococcus aureus | 5000 | 2184 | 1624 | 280 | 28 | 1 | 1 |
| | Pseudomonas aeruginosa | 7500 | 4368 | 3080 | 2733 | 1288 | 1 | 1 |
| | Salmonella poona | 9000 | 7392 | 6384 | 4928 | 4168 | 1 | 1 |
| | Enterococci | 5000 | 4526 | 3024 | 1120 | 5 | 1 | 1 |

FIG. 8 illustrates that PLA/Stainless steel 17-4 sheet has a remarkable efficiency against *Staphylococcus aureus* after 5, 10, and 20 minutes. After 1 hr. almost 100% was achieved against *Staphylococcus aureus*. Furthermore, the bacterial reduction was almost 100% for each type of bacteria after 8 hours and 24 hours. In general, we can say that the antimicrobial efficiency of PLA/Copper sheet and PLA/Bronze is the same with some minor differences. Whereas, the PLA/Aluminium-6061 has a better efficiency than PLA/Stainless steel 17-4 sheet. The order of efficiency can be expressed as PLA/Copper≥PLA/Bronze>PLA/Aluminium-6061>PLA/Stainless steel 17-4.

Example 2

Bacterial Elimination and Evaluation

The plate count procedure was used to determine the antimicrobial efficiencies of the 'Control Sheet', PLA/Copper sheet and PLA/Bronze sheet based on their results as described in the previous section. A large amount of bacteria e.g., *E. coli, S. aureus, P. aeruginosa, S. poona*, and *Enterococci*, was observed on the surface of control in petri dishes during different time intervals (data not shown). The results indicate that the plastic control sheet has no antimicrobial efficiency against these bacteria.

However, few if any bacteria were visible on each test plate after treatment with the PLA/Copper sheet or the PLA/Bronze sheet, validating the excellent antimicrobial efficiency of the PLA/copper-based and PLA/bronze based sheets against these bacteria. This is believed to be due to the ability of copper and bronze nanoparticles to coagulate the protein and inhibit bacterial activity and development. Moreover, the bacterial membrane protein may be bonded by the copper and bronze nanoparticles, thus interfering with the synthesis of peptidoglycan, causing hindrance in the cell wall synthesis. This efficiently prevents the growth of *E. coli, S. aureus*, and other bacteria.

The maximum antimicrobial efficiency of PLA/Copper sheet after 1 hr. was 99.99%, 99.98%, 99.99%, 99.99%, and 99.98% against *Escherichia coli, Staphylococcus aureus, Pseudomonas aeruginosa, Salmonella poona*, and *Enterococci*, respectively. Similarly, the antibacterial effectivity of PLA/Bronze sheet was almost the same as that of 'Sample 1' after 1 hr. Furthermore, the prepared antimicrobial sheets were separated from the inactivated bacteria and the bacteria continued its activities.

Example 3

Comparison with Other Materials

A comparison of the present study with previously developed antimicrobial composites from different materials is provided in Table 6. In most studies, the antibacterial efficiency has been tested against two common gram-positive and gram-negative bacteria types, as shown in Table 6. The present results were also compared in pictorial form with the previous data. Hamid et al. (Hamid et al., "In Vitro Assessment of Artificial Aging on the Antifungal Activity of PMMA Denture Base Material Modified with ZRO2 Nanoparticles," International Journal of Dentistry 2021) tested the antibacterial activity of prepared PMMA denture base material modified with ZrO2 nanoparticles against *C. albica* by varying the concentrations of antimicrobial agents during different time intervals. They reported the best results with 5% of material after 30 days. In another study reported by Ansari et al. (Ansari, A. et al., "Green Synthesis of TiO2 Nanoparticles Using Acorns calamus Leaf Extract and Evaluating Its Photocatalytic and In Vitro Antimicrobial Activity," Catalysts 12(2): 181 (2022)), the antimicrobial activity of the prepared material from leaf extracts was tested. They reported that the maximum efficiency was achieved after 24 hrs against common bacteria. Ghanem et al. (Ghanem A. F. et al., "Investigation of water sorption, gas barrier and antimicrobial properties of polycaprolactone films contain modified graphene," Journal of Materials Science 56(1): pp. 497-512 (2021)) tested the antibacterial activity of polycaprolactone films containing modified graphene against *S. aureus* and reported a 76% reduction in density of these bacteria after 24 hours. Wang et al. (Wang, Y. et al., "Microwave-mediated fabrication of silver nanoparticles incorporated lignin-based composites with enhanced antibacterial activity via electrostatic capture effect," Journal of Colloid and Interface Science 583: 80-8 2021) prepared lignin-based composites modified with silver nanoparticles and utilized them as an antibacterial agent against *E. coli* and *S. aureus*. They reported a 99.9% reduction of these bacteria after 5 minutes. Benigno et al. (Bengino, E. et al., "Nanocomposites based on LDPE filled with carbon nanotubes prepared by high energy ball milling and its potential anti-bacterial activity," Polym. Int. 68:1156-1163 (2020)) tested the antibacterial property of low-density polyethylene and multiwalled carbon nanotube-based composites against *E. coli* via the diffusion method. No bacteria colonies were found after 1 hour

TABLE 6

Comparison to other Antimicrobial Composites
Antimicrobial Composites Previously Reported

| Composites | Type of Bacteria | Killing Rate |
|---|---|---|
| PLA/GO 5% | S. aureus & E. Coli | 100% (24 hrs.) |
| PPY/CuO | S. aureus & E. Coli | 100% (8 hrs.) |
| Ag/PPY | S. aureus & E. Coli | 92.6% (24 hrs.) |
| SiO$_2$/PANI | P. aeruginosa | 100% (12 hrs) |
| MWCNT/PANI | S. aureus & E. coli | 99.9% (24 hrs.) |
| Cu$_2$O/rGO | E. coli | 70% & 65% for 18 hrs. |
| Stainless Steel coated with ZRO$_2$/ZnO/TiO$_2$ | S. aureus & E. coli | 81.2% & 72.4% after 12 hrs. |
| Stainless Steel Doped with TiO$_2$ | E. coli | 99.9% after 4 hrs. under UV light |
| Stainless Steel Modified with Peptide | S. aureus & E. Coli | 56.9% after 3 hrs. |
| Stainless Steel Coated with Derived Antimicrobial Peptide | V. natriegens & C. farmer (marine) | 99.79% & 99.33% after 24 hrs. |
| Present Study Composites | | |
| PLA/Copper | E. coli & S. aureus | 99.99% & 99.98% after 1 hour |
| PLA/Aluminum | E. coli & S. aureus | 99.99% (8 hr.) & 98.98% (1 hr.) |
| PLA/Bronze | E. coli & S. aureus | 99.99% & 99.98% after 1 hour |
| PLA/Stainless Steel | E. coli & S. aureus | 99.99% & 99.98% after 8 hours |

Ag = Silver, MWCNT = Multi-walled carbon nanotubes, PANI = Polyaniline, CNPs = Copper nanoparticles, PLA = Polylactic acid, HNT = Halloysite nanotube, GO = Graphene oxide, PPY = Polypyrrole, PVK = Polyvinyl carbazole, ZnO = Zinc oxide, TiO$_2$ = Titanium dioxide, ZrO$_2$ = Zirconium dioxide.

Example 4

Bi-Material Composite Speed of Bacterial Reduction

Figure 9:
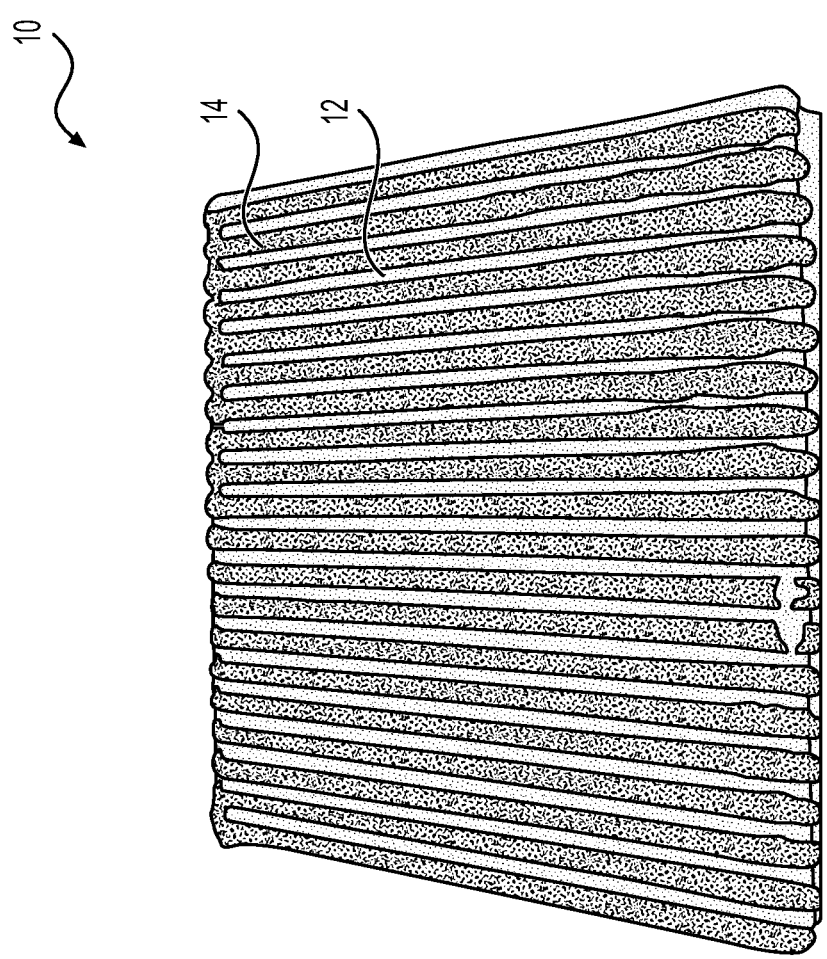
FIG. 9 depicts a bi-metallic polymeric composite.
Figure 10:
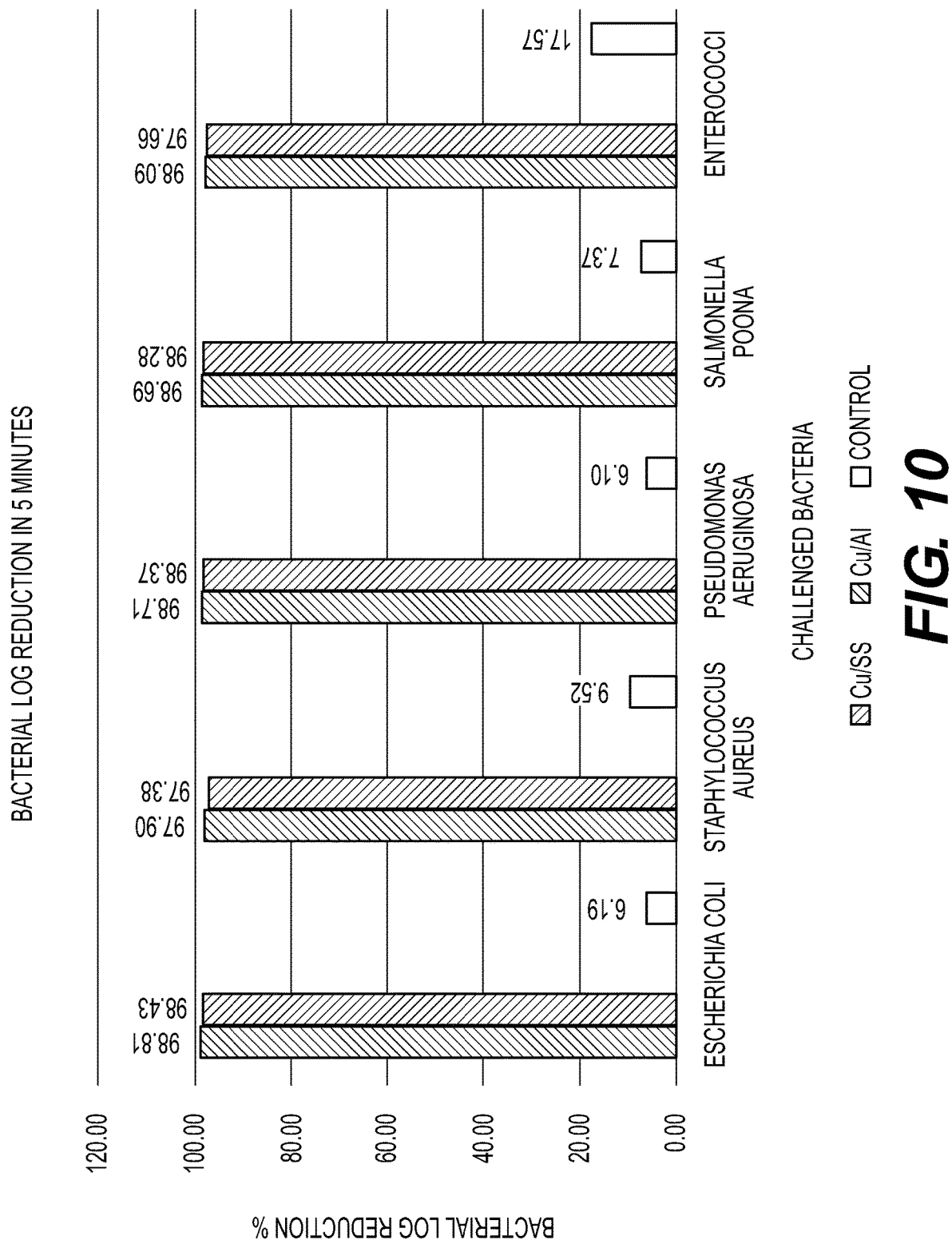
FIG. 10 depicts a graph of the bacterial log reduction observed over 5 minutes for Cu/Ss and Cu/Al bi-metallic sheets.
Figure 11:
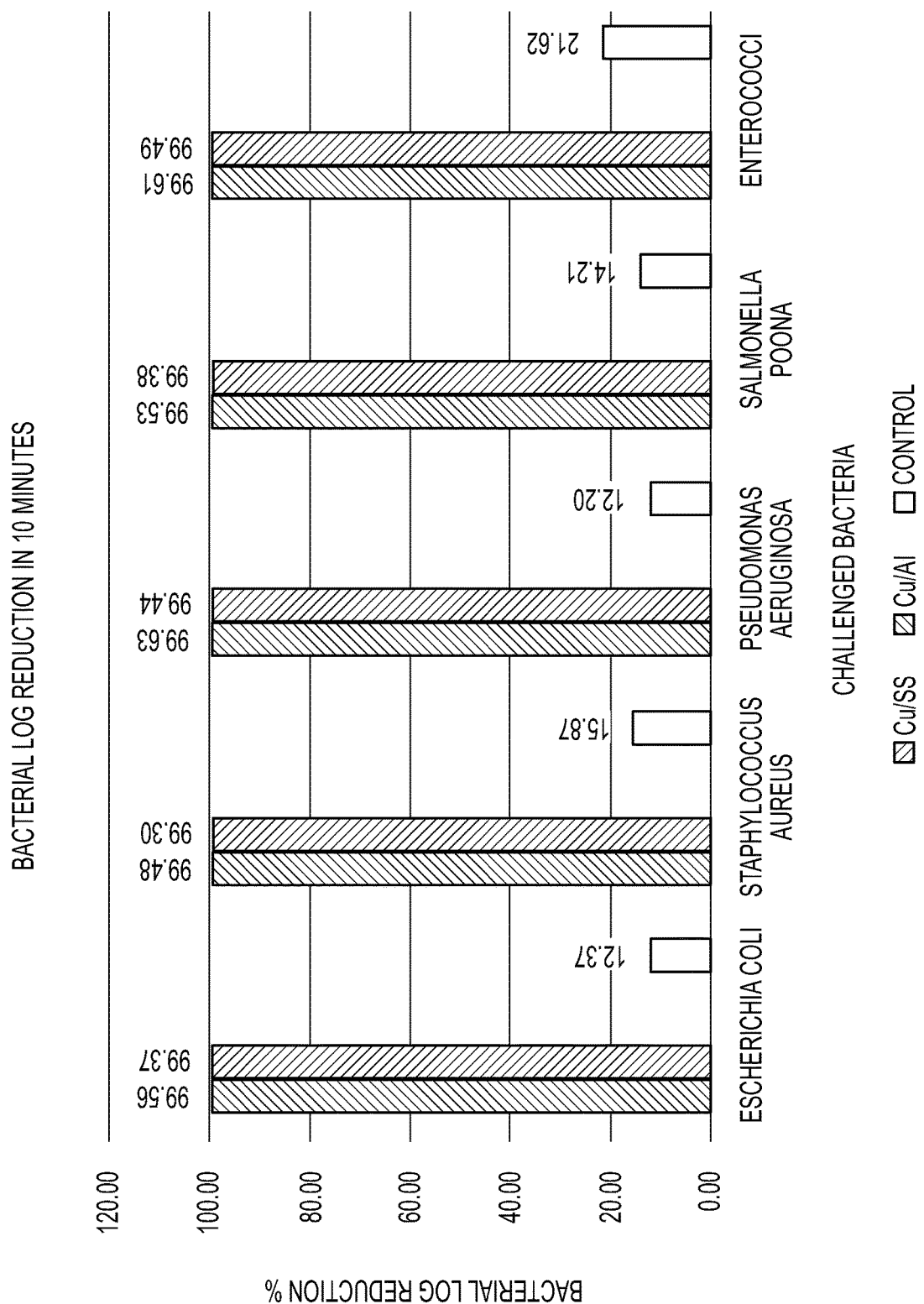
FIG. 11. depicts a graph of the bacterial log reduction observed over 10 minutes for Cu/Ss and Cu/Al bi-metallic sheets.
Figure 12:
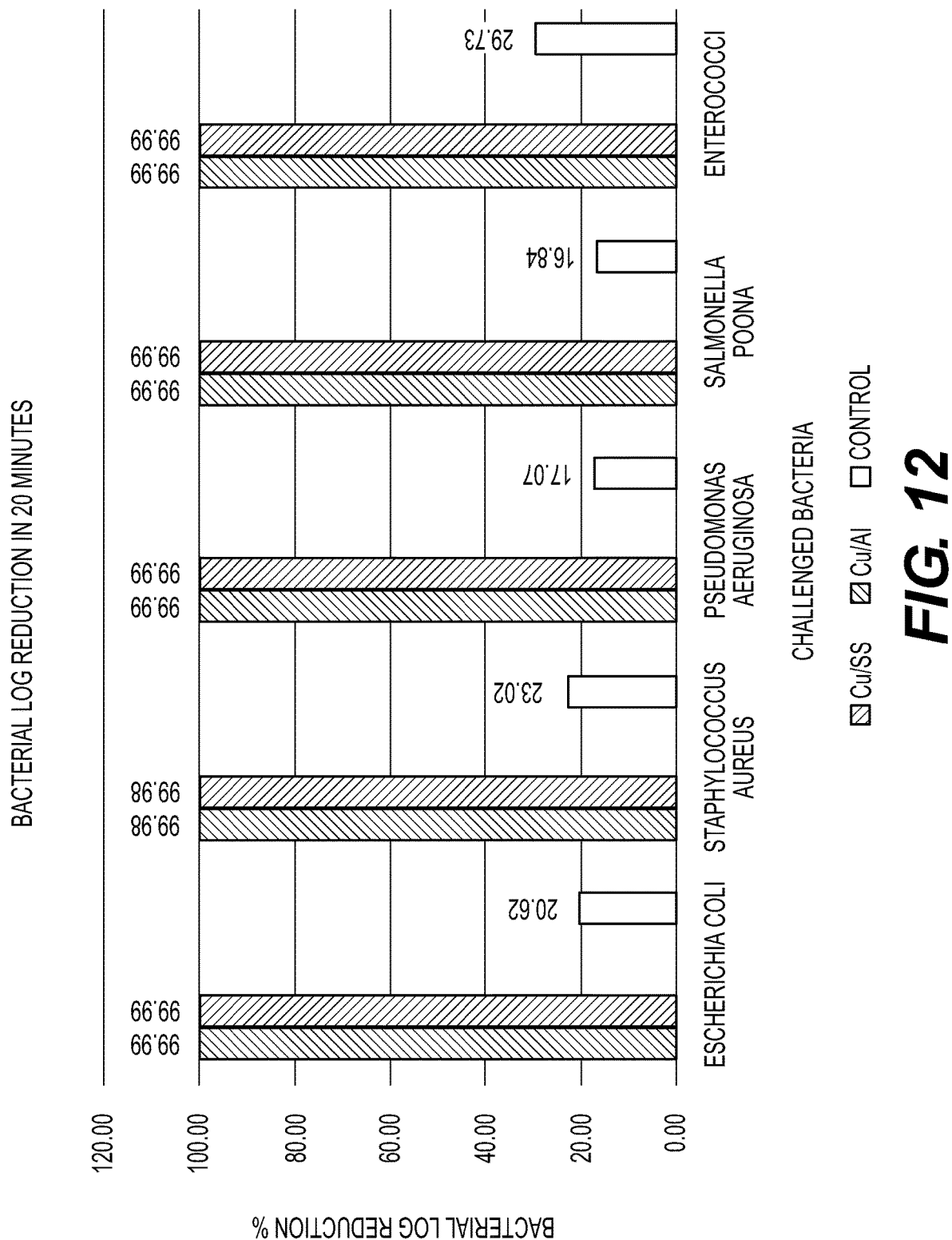
FIG. 12 depicts a graph of the bacterial log reduction observed over 20 minutes for Cu/Ss and Cu/Al bi-metallic sheets.
Figure 13:
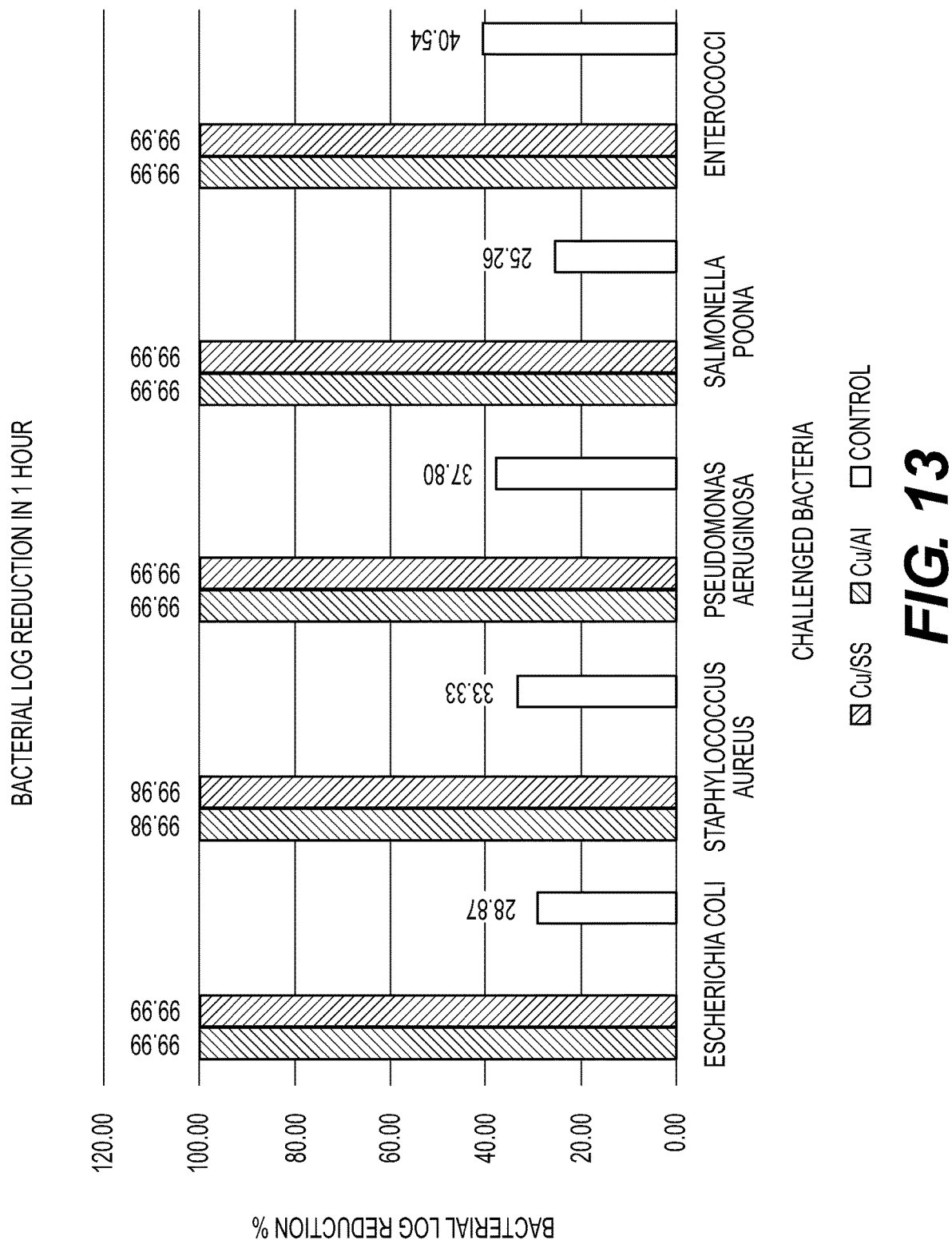
FIG. 13 depicts a graph of the bacterial log reduction observed over 1 hour for Cu/Ss and Cu/Al bi-metallic sheets.
Figure 14:
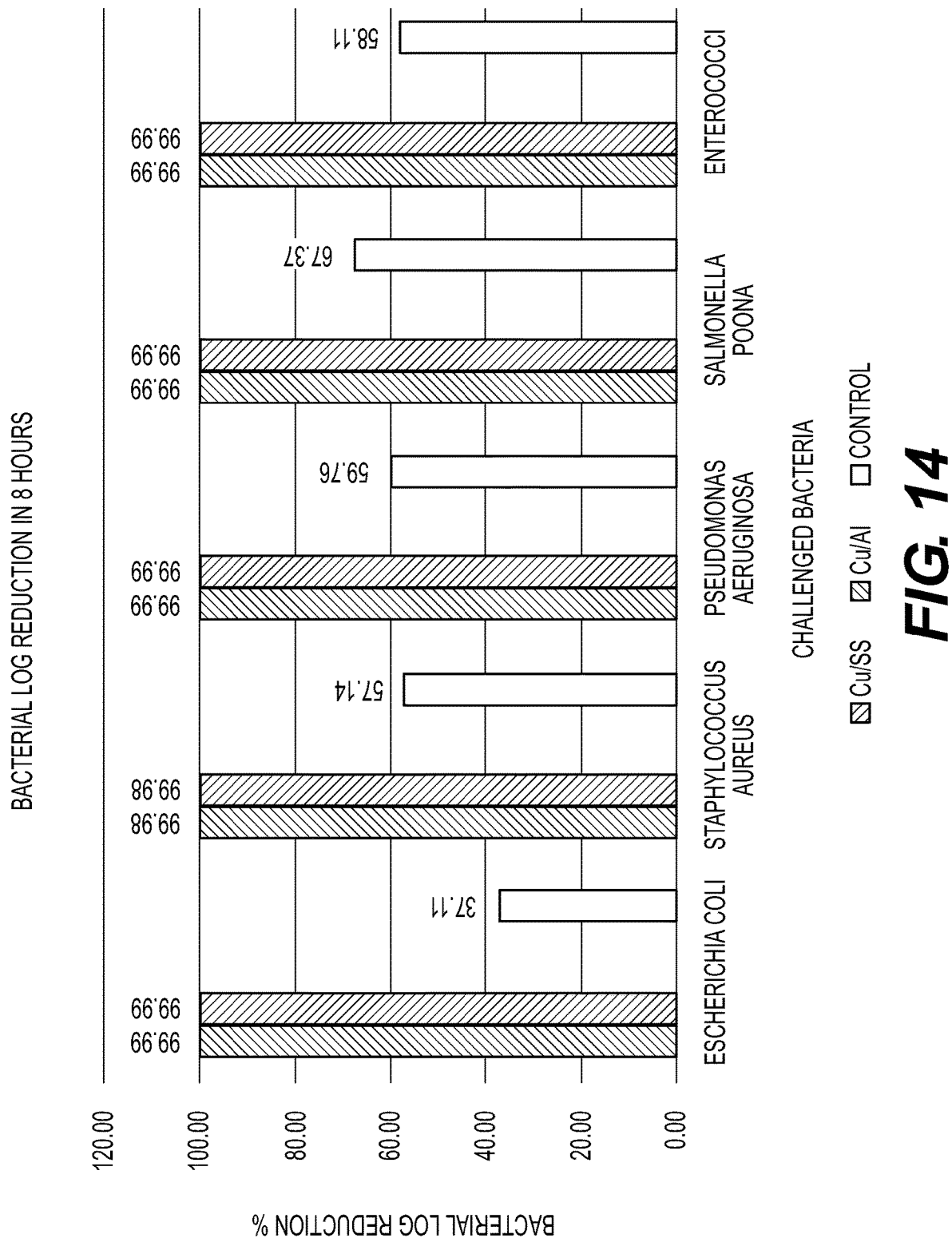
FIG. 14 depicts a graph of the bacterial log reduction observed over 8 hours for Cu/Ss and Cu/Al bi-metallic sheets.
Figure 15:
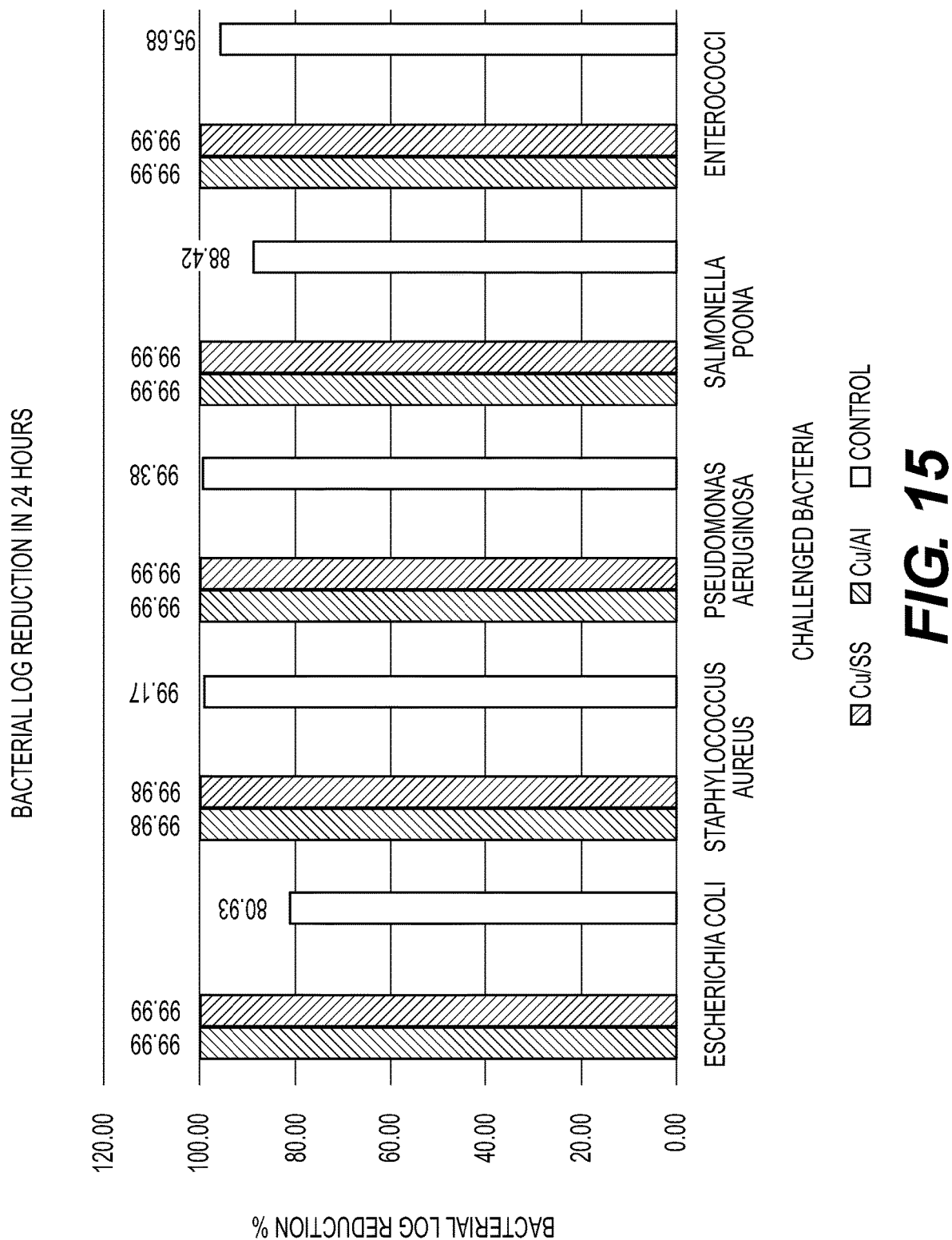
FIG. 15 depicts a graph of the bacterial log reduction observed over 24 hours for Cu/Ss and Cu/Al bi-metallic sheets.
Figure 16:
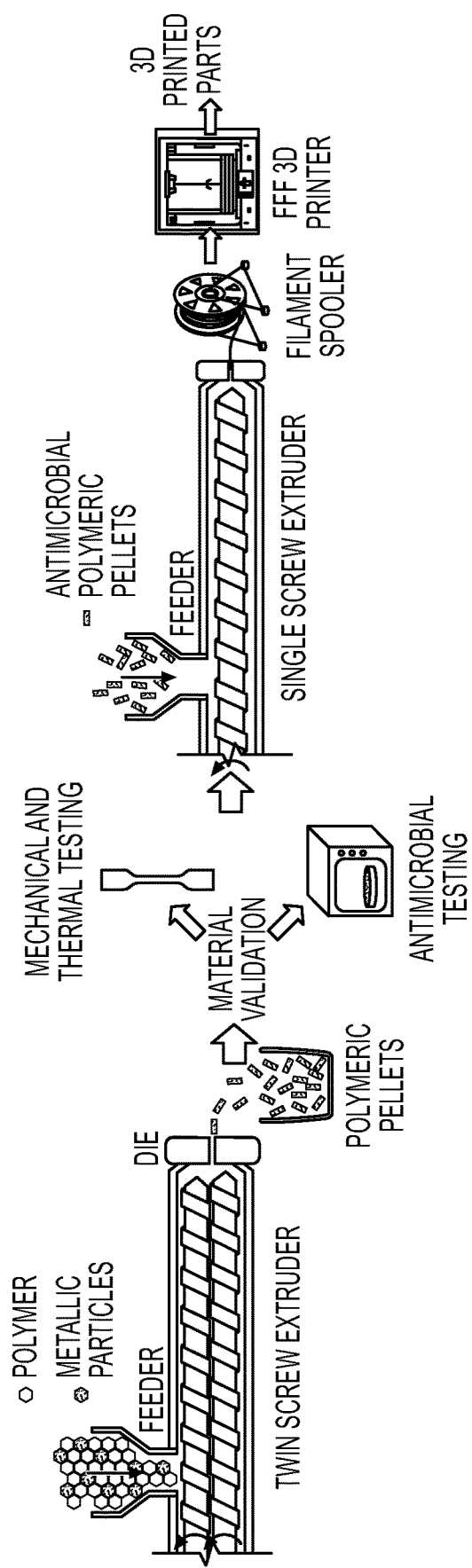
FIG. 16 depicts two different manufacturing and quality control/testing processes for production of the bi-metallic polymeric composites.
Figure 17:
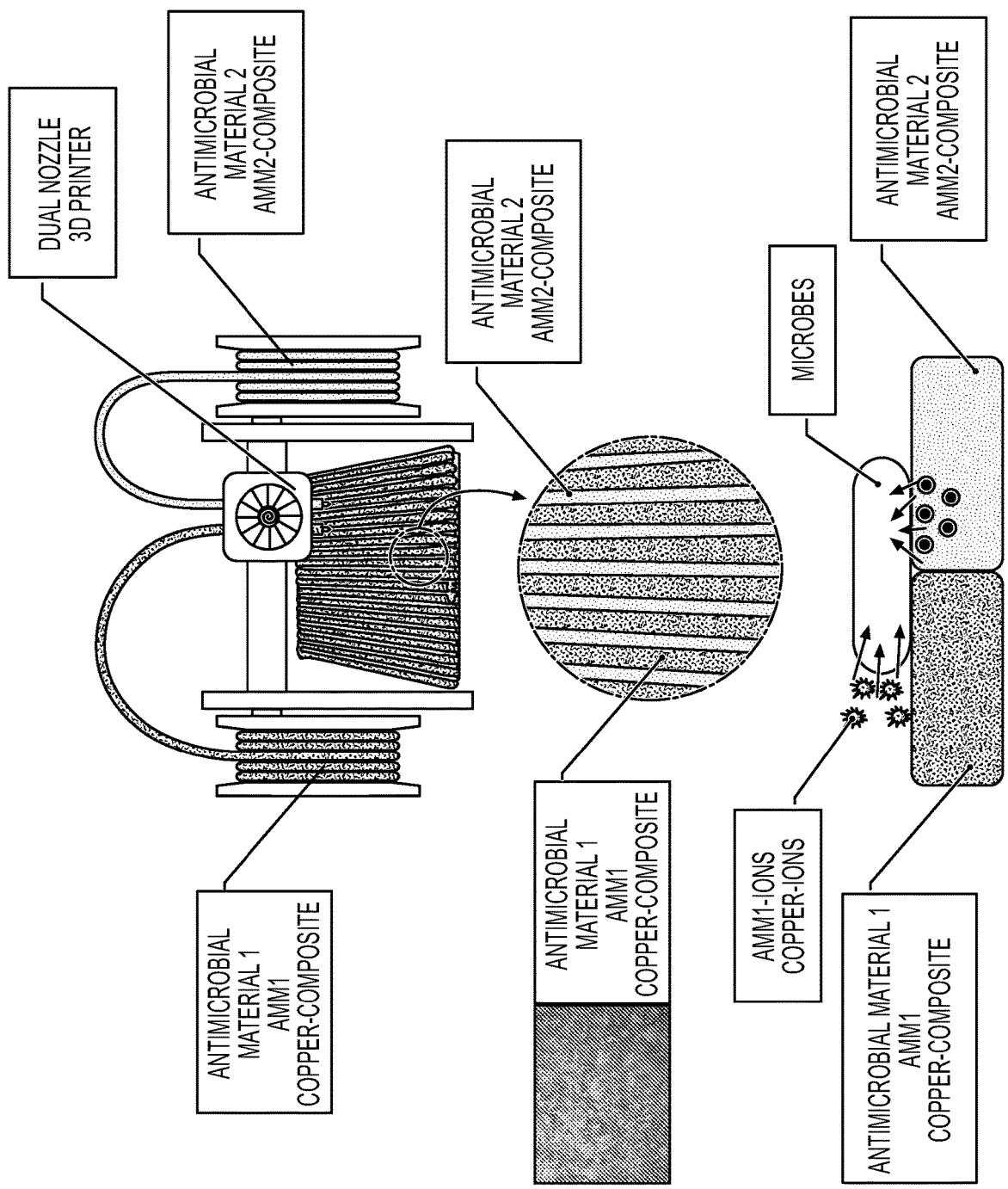
FIG. 17 depicts the production of the bi-metallic polymeric composites using a dual nozzle 3D printer.

The antimicrobial Non-Conductive Bi-Material Composite was produced using 3D printing with dual 3D printer nozzles to produce strips of Bi material side by side. As shown in FIG. 9, the bi-material composite sheet (10) includes both Copper (12) and Stainless Steel (14). The resulting bi-material composite sheets were formed using either Copper/Aluminum PLA based composites or Copper/Stainless Steel PLA based composites. The resulting Cu/SS and Cu/Al composite sheets were tested to demonstrate the rapidity with which they cleared bacteria from their surface under identical conditions to those discussed above with respect to the single metal sheets (See Example 1).

The reduction in bacteria during the tests for the Cu/SS and Cu/Al was extraordinary and significant, and approximately twice the speed of bacterial reduction for the single composite samples (See FIGS. 10-15 and Table 7). Further, the bi-material composites reached a bacterial reduction of around 99% within 5 min. This is attributed to the high electromotive force (EMF) difference between the Bi-materials, which may have contributed to the rapid diminishing of viable bacterial counts for all five types of tested bacterial over a particularly short period of time.

TABLE 7

Antimicrobial Characteristics of Bi-Metallic Polymeric Sheets

| | | Log Reduction % | | | | | |
|---|---|---|---|---|---|---|---|
| Sample | Bacteria | 5 min | 10 min | 20 min | 1 hour | 8 hrs. | 24 hrs. |
| Control | Escherichia coli | 6.19 | 12.37 | 20.62 | 28.87 | 37.11 | 80.93 |
| Sheet | Staphylococcus aureus | 9.52 | 15.87 | 23.02 | 33.33 | 57.14 | 99.17 |
| | Pseudomonas aeruginosa | 6.10 | 12.20 | 17.07 | 37.80 | 59.76 | 99.38 |
| | Salmonella poona | 7.37 | 14.21 | 16.84 | 25.26 | 67.37 | 88.42 |
| | Enterococci | 17.57 | 21.62 | 29.73 | 40.54 | 58.11 | 95.68 |
| Cu/SS | Escherichia coli | 98.81 | 99.56 | 99.99 | 99.99 | 99.99 | 99.99 |
| | Staphylococcus aureus | 97.90 | 99.48 | 99.98 | 99.98 | 99.98 | 99.98 |
| | Pseudomonas aeruginosa | 98.71 | 99.63 | 99.99 | 99.99 | 99.99 | 99.99 |
| | Salmonella poona | 98.69 | 99.53 | 99.99 | 99.99 | 99.99 | 99.99 |
| | Enterococci | 98.09 | 99.61 | 99.99 | 99.99 | 99.99 | 99.99 |
| Cu/Al | Escherichia coli | 98.43 | 99.37 | 99.99 | 99.99 | 99.99 | 99.99 |
| | Staphylococcus aureus | 97.38 | 99.30 | 99.98 | 99.98 | 99.98 | 99.98 |
| | Pseudomonas aeruginosa | 98.37 | 99.44 | 99.99 | 99.99 | 99.99 | 99.99 |
| | Salmonella poona | 98.28 | 99.38 | 99.99 | 99.99 | 99.99 | 99.99 |
| | Enterococci | 97.66 | 99.49 | 99.99 | 99.99 | 99.99 | 99.99 |

It is to be understood that the antimicrobial bi-metallic polymeric composites are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. An antimicrobial bi-metallic polymer-based composite comprising:
 a first plurality of metallic particles encased by a first insulating material, each of the first plurality of metallic particles comprising a first metal; and
 a second plurality of metallic particles encased by a second insulating material, each of the second plurality of metallic particles comprising a second metal;
 wherein the first metal and the second metal are different metals, wherein the first insulating material and the second insulating material may be the same or different, and wherein each of the first plurality of metallic particles and the second plurality of metallic particles are rendered non-conductive due to the first insulating material and the second insulating material, respectively.

2. The composite of claim 1, wherein the first metal and second metal are independently selected from the group consisting of copper, stainless steel, aluminum, bronze, and combinations thereof.

3. The composite of claim 1, wherein the first plurality of metal particles is mixed with the first insulating material and the second plurality of metal particles is mixed with the second insulating material.

4. The composite of claim 1, wherein the first plurality of metallic particles and the second plurality of metallic particles are 3D printed on a substrate comprising the first insulating material and the second insulating material, respectively, wherein the first plurality of metallic particles and the second plurality of metallic particles are 3D printed in strips having a side-by-side relationship, with strips comprising the first plurality of metallic particles being between strips comprising the second plurality of metallic particles on a side-by-side basis.

5. The composite of claim 1 wherein the first insulating material and the second insulating material are both a thermoplastic polymer.

6. The composite of claim 5 wherein the thermoplastic polymer is polylactic acid.

7. The composite of claim 1, wherein the first metal comprises copper.

8. The composite of claim 7, wherein the second metal comprises stainless steel.

9. The composite of claim 7, wherein the second metal comprises aluminum.

10. The composite of claim 1, wherein the composite kills more than 97% of bacterial cells withing five minutes upon contacting the composite with a liquid comprising said bacterial cells.

11. The composite of claim 1, wherein the composite kills more than 98% of bacterial cells withing ten minutes upon contacting the composite with a liquid comprising said bacterial cells.

12. The composite of claim 1, wherein the composite kills more than 99% of bacterial cells withing twenty minutes upon contacting the composite with a liquid comprising said bacterial cells.

13. The composite of claim 10, wherein the bacterial cells are selected from the group consisting of *E. coli, S. Aureus, P. aueruginosa, S. poona*, and *Enterococci*.

14. An antimicrobial bi-metallic polymer-based composite comprising:
a first metal;
a second metal; and
an insulating material;
wherein the first metal and the second metal are each encased or attached to the insulating material, rendering both the first metal and the second metal as non-conductive; wherein the first metal and the second metal comprise different metals; and wherein the composite kills more than 97% of bacterial cells within five minutes upon contacting the composite with a liquid comprising said bacterial cells.

15. The composite of claim 14, wherein the first metal and second metal are independently selected from the group consisting of copper, stainless steel, aluminum, bronze, and combinations thereof.

16. The composite of claim 14, wherein the bacterial cells are selected from the group consisting of *E. coli, S. Aureus, P. aueruginosa, S. poona*, and *Enterococci*.

17. The composite of claim 14, wherein the composite is formulated for spray administration to a surface or material.

18. The composite of claim 17, wherein the surface or material is selected from the group consisting of textiles, face masks, fabrics, clothes, shoes, chairs, desks, door handles, and medical devices.

19. The composite of claim 14, wherein the composite is formulated for incorporation during the manufacturing of a surface or material.

20. The composite of claim 19, wherein the surface or material is selected from the group consisting of textiles, face masks, fabrics, clothes, shoes, chairs, desks, door handles, and medical devices.

* * * * *